(12) United States Patent
Dinesh et al.

(10) Patent No.: US 8,300,771 B2
(45) Date of Patent: Oct. 30, 2012

(54) SYSTEMS AND METHODS FOR CHARACTERIZING LOOP TERMINATION VIA SINGLE-ENDED LINE TESTING

(75) Inventors: Vaibhav Dinesh, New Delhi (IN);
Kunal Raheja, Up (IN); Amitkumar Mahadevan, Eatontown, NJ (US);
Patrick Duvaut, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 1002 days.

(21) Appl. No.: 12/325,541

(22) Filed: Dec. 1, 2008

(65) Prior Publication Data

US 2010/0086105 A1    Apr. 8, 2010

Related U.S. Application Data

(60) Provisional application No. 61/102,063, filed on Oct. 2, 2008.

(51) Int. Cl.
*H04M 1/24*  (2006.01)
*H04M 3/08*  (2006.01)
*H04M 3/22*  (2006.01)

(52) U.S. Cl. ............... 379/27.03; 379/22.02; 379/22.03; 379/24

(58) Field of Classification Search ........... 379/1.01, 379/1.03, 1.04, 3, 14.01, 22.01, 22.04, 23, 379/24, 27.01, 27.03, 29.01, 29.05, 29.1, 379/12, 22.02, 22.03, 27.02, 30
See application file for complete search history.

(56) References Cited

U.S. PATENT DOCUMENTS

| | | | |
|---|---|---|---|
| 6,263,048 B1 * | 7/2001 | Nelson et al. | 379/27.03 |
| 2005/0163287 A1 * | 7/2005 | Ouyang et al. | 379/3 |
| 2006/0120442 A1 * | 6/2006 | Melsa et al. | 375/222 |
| 2006/0182169 A1 * | 8/2006 | Belge et al. | 375/222 |
| 2006/0251160 A1 * | 11/2006 | Fazlollahi et al. | 375/222 |
| 2008/0089485 A1 * | 4/2008 | Duvaut et al. | 379/1.03 |
| 2011/0188640 A1 * | 8/2011 | Cioffi et al. | 379/27.01 |

OTHER PUBLICATIONS

T. Bostoen, P. Boets, M. Zekri, L. V. Biesen, T. Pollet and D. Rabijns, "Estimation of the Transfer Function of a Subscriber Loop by means of a One-Port Scattering Parameter Measurement at the Central Office," IEEE Journal on Selected Areas in Communications, vol. 20, No. 5, pp. 936-948, Jun. 2002.

Ouyang, Feng, "From ABCD to S Matrix", Conexant Systems Inc. Technical Document, Jun. 12, 2006.

(Continued)

*Primary Examiner* — Binh Tieu
(74) *Attorney, Agent, or Firm* — Mark J. Danielson; Pillsbury Winthrop Shaw Pittman LLP

(57) ABSTRACT

Disclosed are various embodiments for determining a state of loop termination. One embodiment comprises receiving an un-calibrated echo signal for the loop under test using frequency domain reflectometry single-ended line testing (FDR-SELT) and determining the state of loop termination based on phase of the un-calibrated echo signal. The step of determining the state of loop termination comprises determining whether the loop is terminated by an open termination or a short termination by correlating the phase of the echo signal with an expected phase of the echo signal derived from measurements taken at the same loop length for open and short terminations. For other embodiments, the amplitude of the un-calibrated echo signal is analyzed to determine whether the loop is terminated by a matched-impedance termination.

31 Claims, 16 Drawing Sheets

OTHER PUBLICATIONS

Bell, Alcatel, "SELT: Derivation of Formula for Computation of Calibrated S11", ITU Telecommunications Standardization Sector, COM 15-D 921-E (Study Group 15—Delayed Contribution 921), Oct. 21-31, 2003.

Stefano Galli et al, "Loop Makeup Identification via Single Ended testing: beyond Mere Loop Qualification", IEEE Journal on Selected Areas in Communications, vol. 20, No. 5, Jun. 2002.
U.S. Appl. No. 12/138,692, filed Jun. 13, 2008, Vaibhav et al.
U.S. Appl. No. 12/164,488, filed Jun. 30, 2008, Vaibhav et al.

* cited by examiner

SYSTEMS AND METHODS FOR CHARACTERIZING LOOP TERMINATION VIA SINGLE-ENDED LINE TESTING

CROSS-REFERENCE TO RELATED APPLICATION

This application claims priority to, and the benefit of, U.S. Provisional Patent Application entitled, "Systems and Methods for Characterizing Loop Termination via Single-Ended Line Testing," having Ser. No. 61/102,063, filed on Oct. 2, 2008, which is incorporated by reference in its entirety.

TECHNICAL FIELD

The present disclosure generally relates to point-to-point wire line communications and more particularly to single-ended loop testing of digital subscriber line (DSL) communication systems.

BACKGROUND

Prior to deploying xDSL transmissions, a subscriber loop is generally qualified or characterized by estimating the channel capacity, which depends on the transfer function of the network. The subscriber loop (or line) connects the customer premises (CP) to the central office (CO) and can be affected by a wide range of impairments, including but not limited to, load coils, bridge taps, mixed wire gauges, and bad splices. While the loop length and the wire gauge of the loop are generally not considered actual impairments, they can also have a large impact on xDSL transmissions. Other impairments include split pairs, untwisted drop cables, radio-frequency interference (RFI), and cross-talk. Moreover, several of the impairments mentioned above for xDSL transmissions are not present for POTS (plain old telephony service) because xDSL exploits a much wider frequency band as compared to POTS. Consequently, the existing POTS testing equipment is not capable of qualifying a subscriber loop for xDSL transmission.

Due to these impairments, the xDSL network termination (NT) installed at the CP may in some cases not even link up with the xDSL line termination (LT) in the DSL access multiplexer (DSLAM) at the CO. If the xDSL modems do link up with one another, there is no guarantee with respect to the quality-of-service (QoS) in terms of bit rate. Qualifying a subscriber loop for xDSL requires estimating its channel capacity, which depends on the attenuation of the line and also on the noise power spectral density (PSD) at the CO for upstream reception and at the CP for downstream reception, respectively. The estimate of the channel capacity of a particular loop/line will be most accurate if the transfer function of the line and the noise PSD at the CO and CP are measured directly.

Conventional methods for qualifying a subscriber loop include use of xDSL test units available on the market that are capable of performing such measurements. In addition, these test units are often combined with a "golden" modem plug-in module that emulates a real xDSL modem of a certain type, such as ADSL, in order to estimate the real bit rate instead of only the theoretical channel capacity. However, this approach requires sending a technician to the CP, which is very expensive.

Single-ended loop testing (SELT) can be used to extract information about the transmission environment (e.g., the loop) in a DSL system by performing reflective measurements remotely at the CO/CPE terminal, without the need to dispatch a technician. As an example, SELT may comprise injecting signals into a loop under test at a central office (CO) in order to determine the loop capability for supporting different kinds of DSL services. As such, SELT often plays an important role in DSL provisioning and maintenance.

SUMMARY

One embodiment, among others, is a method for determining whether a state of loop termination of a loop is short terminated, open terminated, or terminated by a matched-impedance. The method comprises receiving an un-calibrated echo signal for a loop under test using frequency domain reflectometry single-ended line testing (FDR-SELT), a loop length estimate of the loop, a region, and a platform specification. The method further comprises determining coefficients corresponding to each of a predetermined set of tones, wherein the set of tones is a function of loop length, and wherein the coefficients are determined based on the specified region and platform. The method also comprises determining phase thresholds for the predetermined set of tones based on the determined coefficients and loop length such that the phase thresholds at the predetermined tones correspond to polynomial-fitted decision phase values that are a function of loop length for the received region and platform and comparing the phase thresholds with corresponding phases of a filtered echo signal at each of the set of predetermined tones and determining whether the loop is terminated by an open or short termination at each of the predetermined tones.

Another embodiment is a system for determining a state of loop termination of a loop. The system comprises a first module coupled to the loop, where the first module is configured to generate a test signal and receive an un-calibrated echo response of the loop. The system further comprises a second module configured to receive the un-calibrated echo response measurement from the first module, wherein the second module is further configured to receive a region, platform type, and a loop length estimate and determine whether the loop is open terminated or short terminated based on the phase of the un-calibrated echo signal.

Another embodiment is a method for determining a state of loop termination of a loop under test. The method comprises receiving an un-calibrated echo signal for the loop under test using frequency domain reflectometry single-ended line testing (FDR-SELT) and determining the state of loop termination based on phase of the un-calibrated echo signal, wherein determining the state of loop termination comprises determining whether the loop is terminated by an open termination or a short termination by correlating the phase of the echo signal with an expected phase of the echo signal derived from measurements taken at the same loop length for open and short terminations. For other embodiments, the amplitude of the un-calibrated echo signal is analyzed to determine whether the loop is terminated by a matched-impedance termination.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

Figure 1:
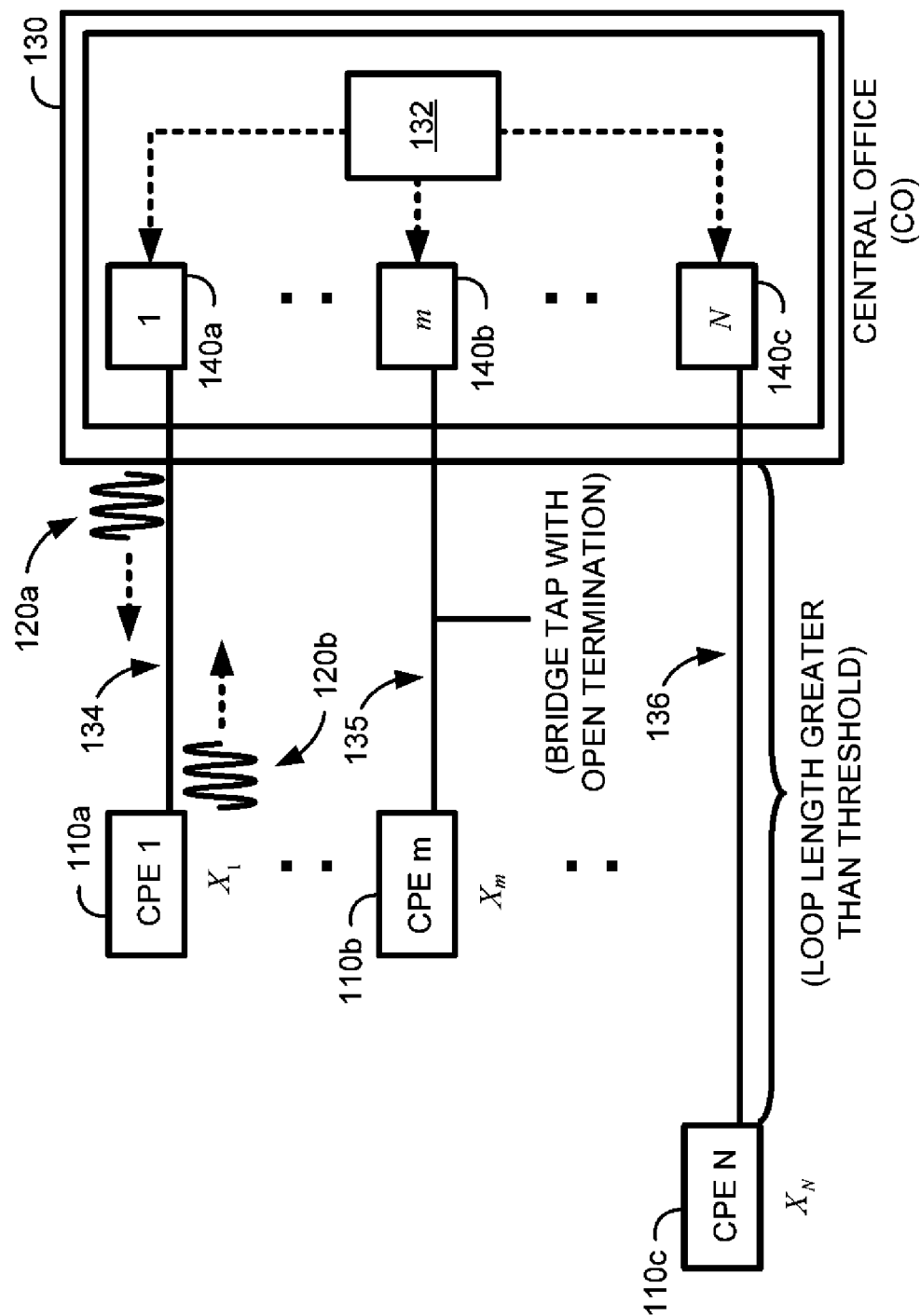
FIG. 1 illustrates an xDSL system in which embodiments of FDR-SELT are applied.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In a wire-line broadband system, one of the primary objectives is to qualify a subscriber-loop for xDSL transmission by estimating its channel capacity. This can be achieved if loop characteristics such as the topology, loop-length, loop gauge, are known. In addition, information on potential problems or faults in the loop, as well as the possible presence of a modem at the consumer location can be obtained from the knowledge of the loop termination. These loop characteristics (topology, loop-length, loop gauge, loop termination) also serve as useful tools for trouble-shooting and diagnostic purposes in the event that a provisioned service experiences problems or fails.

As discussed earlier, SELT, or single-ended loop testing, can be used to extract valuable information about the transmission environment (e.g., the loop) in a DSL system by performing reflective measurements remotely at the CO/CP (or Modem) terminal, without the need to dispatch a technician. One approach to using SELT involves "per-port calibration," which relates to removing near-end echo, stemming from the measurement equipment, on a per-port basis at the factory. The data derived at the factory for each port is shipped to end users for them to calibrate their equipment. Equipment vendors, however, incur increased equipment cost and operation costs for incorporating calibration data. Furthermore, end users incur the cost of associating the calibration data with the physical units.

Systems and methods are thus described herein for analyzing the un-calibrated echo ($S_{11}(f)$) in the frequency domain to estimate the loop characteristics discussed above. More specifically, the loop length of the subscriber loop is estimated. It should be appreciated that with exemplary embodiments described herein, the use of un-calibrated FDR-SELT techniques avoids the need for conducting a set of reference measurements for each port at the manufacturing plant and storing these measurements for future access. The systems and methods described herein function independently of the port employed in conducting FDR-SELT measurements. It should also be emphasized that the systems and methods for using un-calibrated FDR-SELT measurements may be applied across different central office (CO) platforms and any field deployment scenarios.

It should be noted that in describing representative embodiments herein, various embodiments may be presented as a particular sequence of steps. The methods or processes should not, however, be limited to the particular sequence of steps described. As one of ordinary skill in the art will appreciate, other sequences of steps may be possible, and the particular order of steps set forth herein should not be construed as limitations on the claims. In addition, the claims directed to the method and/or process of various embodiments should not be limited to the performance of their steps in the order written, and one skilled in the art can readily appreciate that the sequences may be varied and still remain within the spirit and scope of the present invention.

Un-Calibrated SELT-FDR Analysis Framework

One technique used for gathering SELT measurements is frequency-domain reflectometry (FDR) where a frequency sweep is performed on the loop under test in order to derive frequency-selective characteristics. For example, peaks in the measured receive signal correspond to frequencies that create standing waves. Measurement of the one-port scattering parameter involves determining the echo response of the loop. For purposes of nomenclature used herein, the echo response may also be referred to as $S_{11}$, $S_{11}(f)$, or echo signal, and the loop under test may also be referred to as Device Under Test (DUT). Furthermore, the term "raw" echo signal is used to refer to the un-calibrated nature of the measured echo signals. Based on the echo response, the input impedance of the loop as a function of frequency can be determined from which loop characteristics can be estimated. Such characteristics may include, for example, loop length and loop termination type. Exemplary embodiments described herein are based on the un-calibrated FDR-SELT ($S_{11}(f)$) echo in the frequency domain and in particular, on the actual analysis of the un-calibrated echo signal. Based on this analysis, valuable loop information can be derived from different characteristics of the S11 signal. For purposes of nomenclature used herein, the term "Layer 0" generally refers to the phase of FDR-SELT whereby a signal is transmitted into the loop under test and the scattering parameters are captured. The term "Layer 1" generally refers to the post-processing phase whereby the data captured in Layer 0 is used to derive meaningful information relating to the DUT.

Reference is now made to FIG. 1, which illustrates an xDSL system in which embodiments of SELT are applied. In the non-limiting example shown in FIG. 1, N end users (or N sets of CPE 110a, 110b, 110c) are depicted where each user 110a, 110b, 110c is referenced using an index m. The end users 110a, 110b, 110c are connected via a loop to a central office (CO) 130, where a SELT module 132 for deriving loop characteristics based on un-calibrated FDR-SELT measurements may be implemented. The CO 130 may include an xDSL access multiplexer (DSLAM), xDSL line cards 140a, 140b, 140c, and other equipment for interfacing with end users 110a, 110b, 110c. In some embodiments, the SELT module may be incorporated into xDSL line cards 140a, 140b, 140c. In other embodiments, the xDSL line cards 140a, 140b, 140c may interface with the SELT module 132. It should be noted that while embodiments for SELT are described here in the context of central offices, the principles of SELT contained in this disclosure may also be incorporated into customer premises equipment as well.

The SELT module 132 first performs Layer 0 functions and injects a test signal 120a onto the loop under test. The reflected signal 120b is then measured to determine the echo response of the loop. The nature of the reflected signal 120b will vary depending on the characteristics of the loop. FIG. 1 shows three non-limiting examples of various loop configurations. Loop 134 is a straight loop configuration, whereas loop 135 and loop 136 depict a bridge tap loop and a long loop, respectively. Generally, the definition of a "long" loop may vary and is based on a predetermined threshold. As a non-limiting example, any loop that exceeds 4 km may be categorized as a long loop.

Figure 2A:
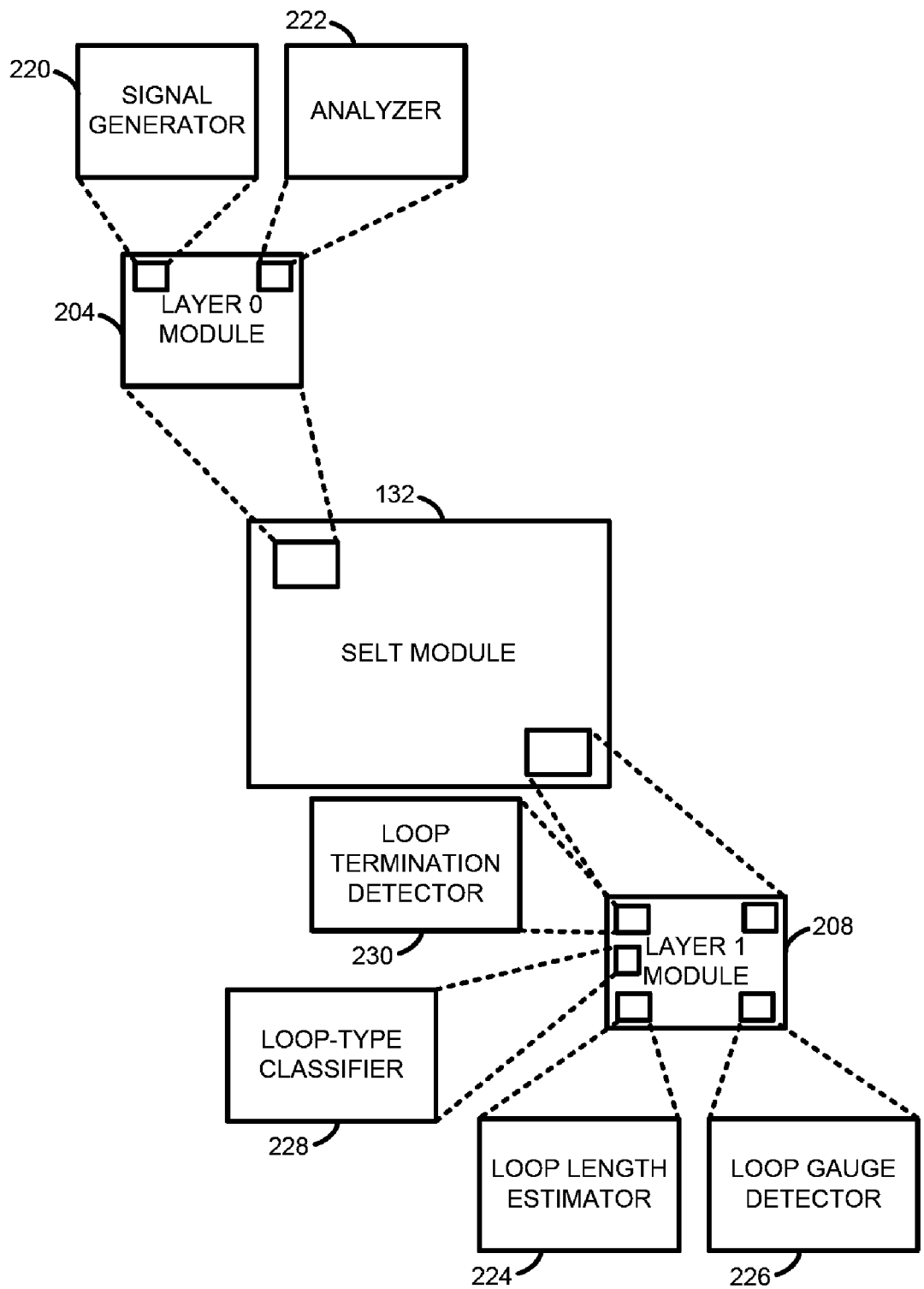
FIG. 2A depicts various components of the FDR-SELT module depicted in FIG. 1.

FIG. 2A depicts various components for the SELT module depicted in FIG. 1. In accordance with exemplary embodiments, the SELT module 132 may comprise a Layer 0 module 204 and a Layer 1 module 208. The Layer 0 module 204 may further comprise a signal generator 220 and an analyzer 222. The signal generator 220 transmits test signals on the loop under test. The analyzer 222 monitors the reflected signal to derive s-parameters associated with the network. The Layer 1 module 208 receives information from the Layer 0 module 204, including an un-calibrated S11 parameter. The Layer 1 module 208 may comprise a loop length estimator 224, a loop-type classifier 228, and a loop termination detector 230. For other embodiments, the Layer 1 module 208 may also include a loop gauge detector 226 if a priori knowledge of the loop gauge is not available.

Figure 2B:
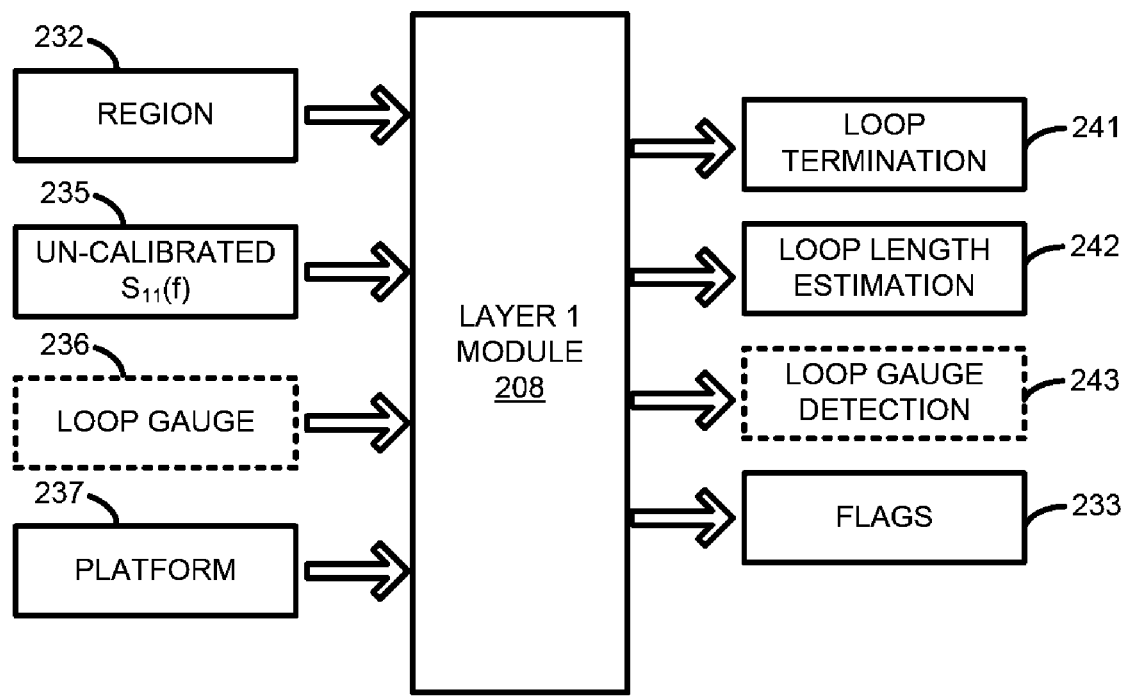
FIG. 2B depicts the signal flow for the Layer 1 module shown in FIG. 2A.

FIG. 2B depicts the signal flow for the Layer 1 module shown in FIG. 2A. Prior to deriving characteristics associated with the loop, the Layer 1 module 208 may receive such inputs as the region 232 associated with the loop. As non-limiting examples, the region may be designated as North America or Japan. The CO (or CPE) platform (i.e., board design information) 237 forms the second input. The un-calibrated S11 parameter 235 is also forwarded to the Layer 1 module 208. Finally, if a priori knowledge regarding the loop gauge is available, then this information may also be forwarded to the Layer 1 module 208. It should be noted that for embodiments described herein, loop length estimates can be derived for straight loops up to a predetermined threshold without prior knowledge of the loop gauge. For some embodiments, this predetermined threshold is 4 km (or approximately 13 kft). Based on the inputs, the Layer 1 module 208 derives information relating to the loop, including an estimation of the loop length 242 and the termination type on the loop 241.

It should be emphasized that depending on whether the Layer 1 module 208 determines that the loop under test is not a straight loop, the Layer 1 module 208 may raise various flags 233 to denote that any further analyses may be inaccurate. For example, in the event that the loop is determined to be a long loop, the Layer 1 module 208 will flag that the measuring capabilities of the overall system has been exceeded. As a result, an indicator or flag of some type may be raised. As another example, the Layer 1 module might raise a flag if the presence of a bridge tap is detected or based on some anomaly observed in the S11 signal, an inconsistency is detected in the loop under test. The purpose of these indicators or flags is to convey that the derived loop characteristics (e.g., loop length, termination type, loop gauge) might not be accurate.

Figure 3:
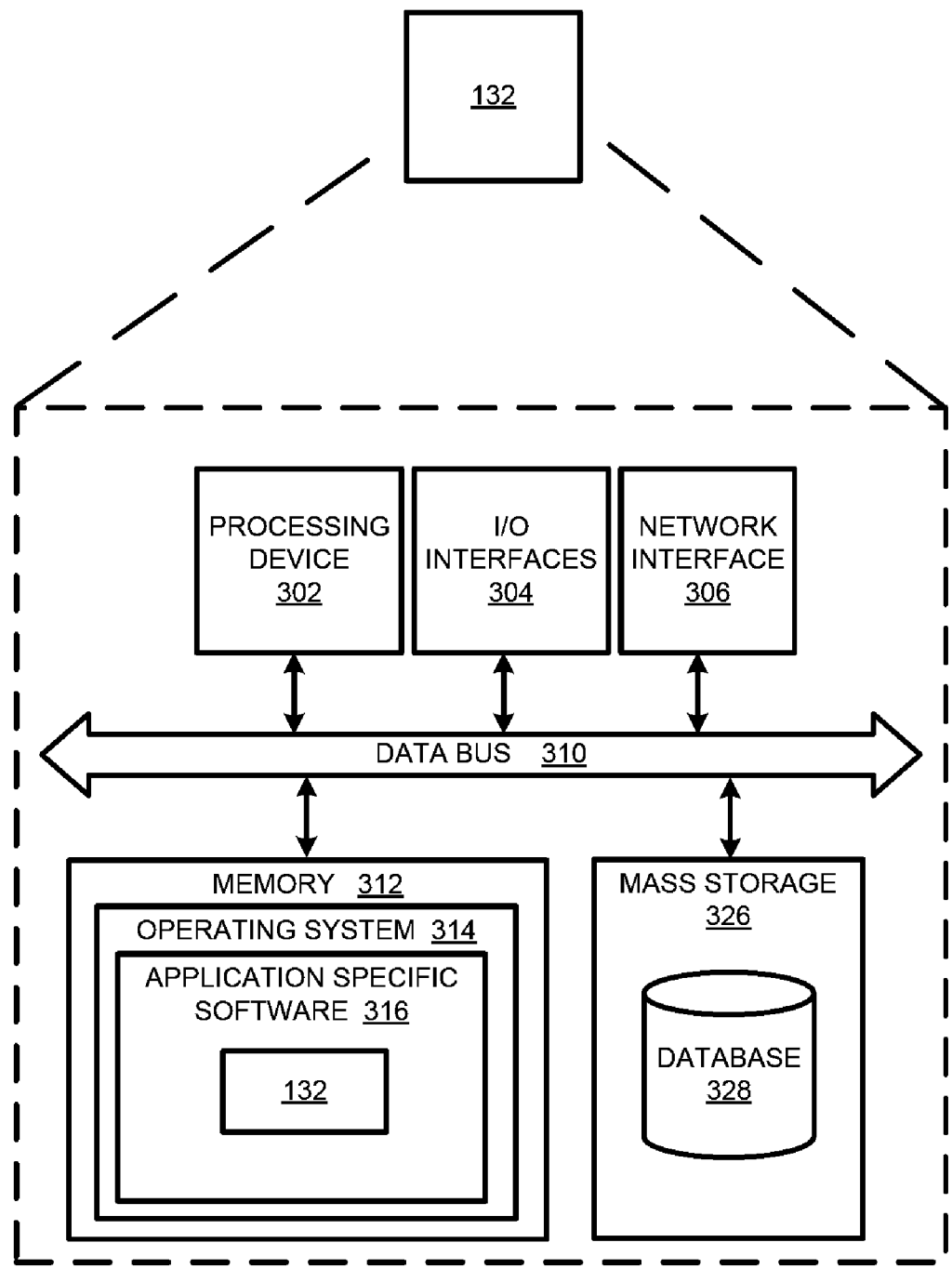
FIG. 3 illustrates an embodiment of the SELT module shown in FIGS. 1 and 2.

Reference is now made to FIG. 3, which illustrates an embodiment of the SELT module shown in FIGS. 1 and 2. Generally speaking, the SELT module 132 may be incorporated into the central office and can comprise any one of a wide variety of computing devices. Irrespective of its specific arrangement, SELT module 132 can, for instance, comprise memory 312, a processing device 302, a number of input/output interfaces 304, a network interface 306, and mass storage 326, wherein each of these devices are connected across a data bus 310.

Processing device 302 can include any custom made or commercially available processor, a central processing unit (CPU) or an auxiliary processor among several processors associated with the SELT module 132, a semiconductor based microprocessor (in the form of a microchip), a macro-processor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 such as the SELT module 132 depicted in FIG. 2A. One of ordinary skill in the art will appreciate that the memory 312 can, and typically will, comprise other components which have been omitted for purposes of brevity.

Input/output interfaces 304 provide any number of interfaces for the input and output of data. With further reference to FIG. 3, network interface device 306 comprises various components used to transmit and/or receive data over a network environment. The SELT module 132 may further comprise mass storage 326. For some embodiments, the mass storage 326 may include a database 328 to store and manage data.

Figure 4:
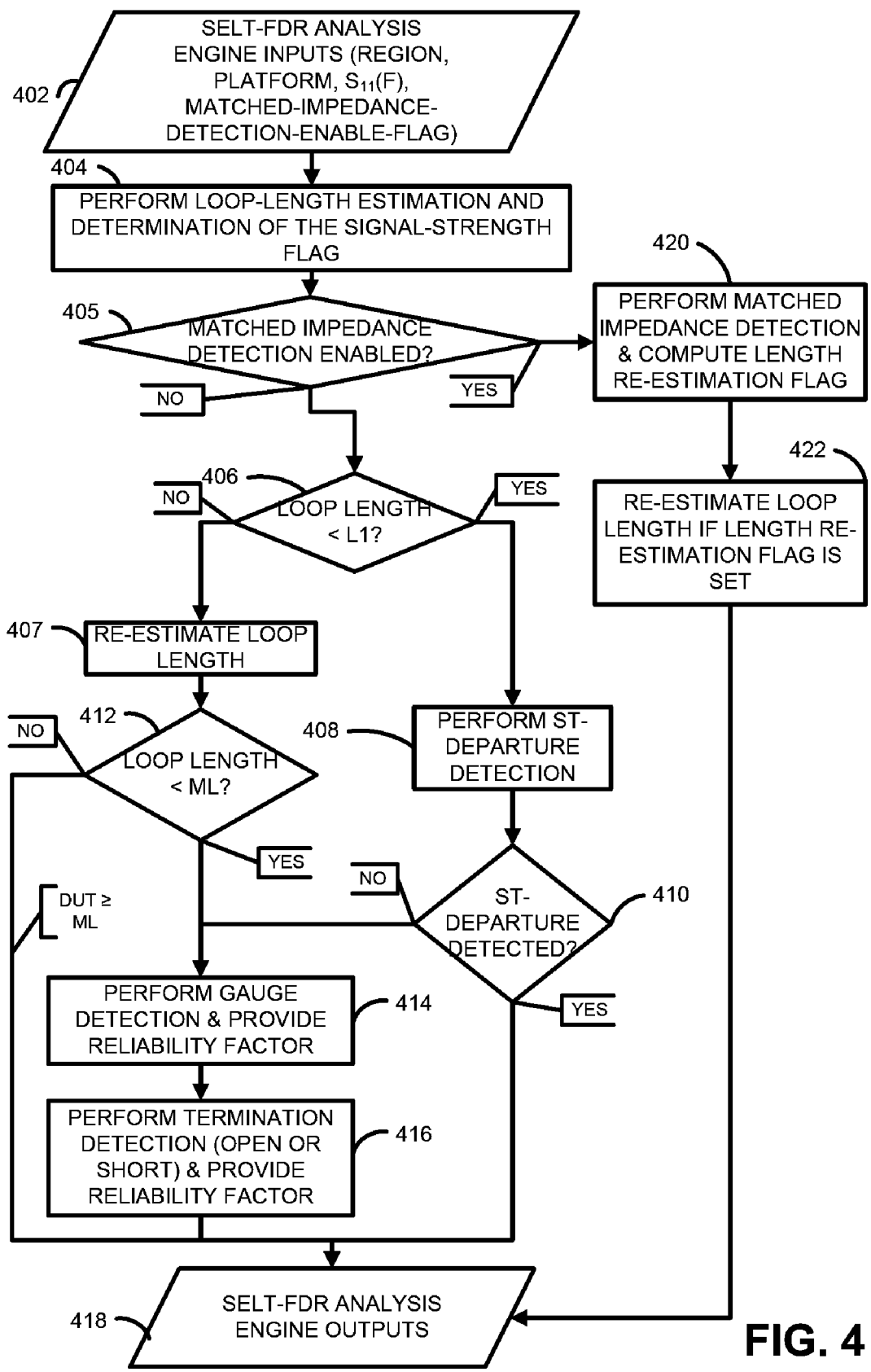
FIG. 4 is a top level flowchart for an embodiment of a process for performing FDR-SELT utilizing the components depicted in FIGS. 1, 2A-B.

FIG. 4 provides a top level flowchart for an embodiment of a process for performing un-calibrated FDR-SELT utilizing the components depicted in FIGS. 1, 2A-B. In particular, FIG. 4 is an embodiment of the overall analysis/processing performed using the un-calibrated echo response obtained for a particular loop. In accordance with exemplary embodiments, the steps discussed below may be performed by the FDR-SELT module 132 shown in FIG. 2A. Based on the un-calibrated echo response, such metrics as loop length, termination type, and loop gauge can be derived. The presence of any inconsistency in the raw echo signal leading to departure from straight-loop signal characteristics (e.g., inconsistencies owing to the presence of a bridge tap) can also be determined based on the echo response.

Block 402 begins by receiving the un-calibrated signal S11, platform, and region associated with the loop and a flag provided for indicating whether matched-impedance detection must be performed or not (e.g., a matched-impedance-detection enable flag). In block 404, loop length estimation is performed and the relative strength of the echo signal is indicated by setting or resetting a signal-strength-flag. If matched-impedance detection is enabled (decision block 405), then matched-impedance detection is performed and along with the matched-impedance detection outcome, the length re-estimation flag is also output (block 420). Further, the loop length may be re-estimated based on the length re-estimation flag (block 422) before the final outputs are delivered by the SELT-FDR analysis engine (block 418).

If matched-impedance detection is disabled, the loop length is compared with a threshold L1 (decision block 406). If the loop length is greater than the threshold L1, then the loop length is re-estimated using criterion employed for estimating lengths greater than L1 (block 407). A subsequent check is performed to determine whether the loop length is less than a second threshold ML, where ML is greater than or equal to L1, in decision block 412. As a non-limiting example, the value of L1 may be set to 9 kft (for North American loops). The threshold value L1 represents an intermediate loop length used to classify the DUT. In accordance with some embodiments, based on how the loop is classified, a particular method for estimating the loop length is performed. The threshold value L1 represents the maximum loop length at which the raw echo signal can be analyzed to determine whether the DUT is a straight loop (or is a departure from a straight loop). It should be appreciated that the value of ML may extend up to 13.2 kft (~4 km).

Referring back to decision block 412, if the loop length is greater than or equal to ML, then the steps involving loop gauge detection and loop termination detection are bypassed as attempts to determine these metrics may yield inaccurate results. If the loop length is less than threshold ML, then the loop gauge is detected and a corresponding reliability factor is derived (block 414). In block 416, the loop termination type and corresponding reliability factor is determined. This information, along with the loop length estimation, is then output in block 418. With reference back to decision block 406, if the loop length is less than threshold L1, then in block 408, a determination is made on whether the loop is a straight-loop (ST) departure, which may be due to, for example, the presence of a bridge tap, inappropriate joints in concatenated loops etc. If a straight-loop departure is detected, then the loop gauge and loop termination type are not determined. For some embodiments, a constant value such as "−1" may be output in block 418 to indicate that the steps for determining the loop gauge and loop termination type (i.e., blocks 414, 416) were bypassed. If the loop is a straight loop, then blocks 414 and 416 are performed.

Determination of Loop Termination Type

Various embodiments for determining the loop termination type are now described. Generally, determining the termination type of a loop comprises determining whether the end of the loop is terminated by a short or open termination, assuming that the loop is a straight loop and that the loop is not a long loop. As will be described later in this disclose, determining the termination type may also comprise determining whether the loop is terminated by a matched-impedance termination. Various embodiments described herein are directed to loops determined to be a straight loop and for loops with a loop length up to approximately 4 km, with or without prior knowledge of the particular loop gauge. In this regard, bridge tap loops as well as any loops inconsistent of straight-loop S11 signal characteristics are not processed.

The S11 signal may be utilized to determine the loop termination type because the phase of the reflected signal (i.e., 0S11 or echo response) depends on how the loop is terminated. Specifically, the phase of the SELT-FDR echo signal S11 depends primarily on the end termination of the loop. A straight loop terminated with a matched-impedance ideally does not cause any echo (in practice, small imperfections in the terminating impedance result in a substantially weakened echo), whereas a loop with either an open or short termination causes a reflection in the transmitted signal. If the loop-end is short-terminated, the reflected signal experiences a phase inversion at the loop-end with reference to the phase response corresponding to an open terminated loop.

Figure 5:
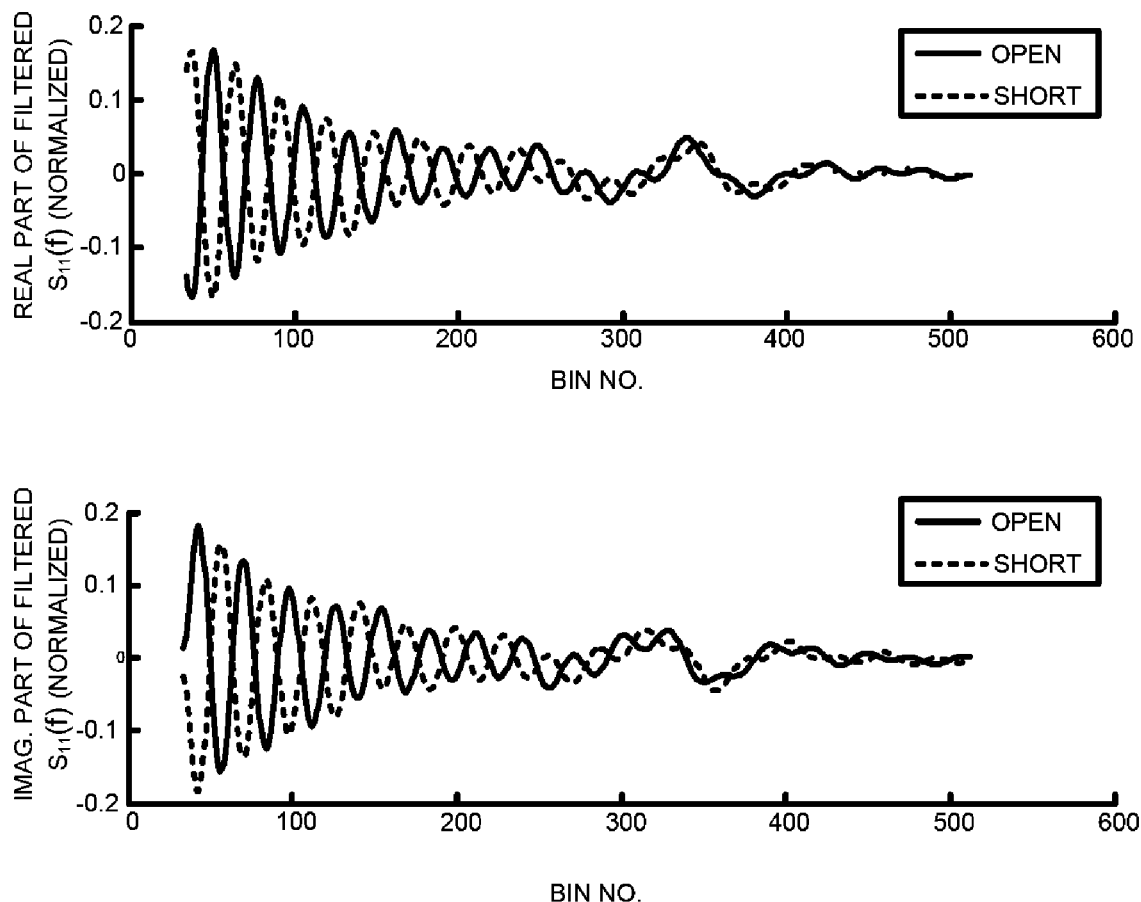
FIG. 5 illustrates the interleaved pattern in the amplitude of the S11 signal caused by the phase variation in the echo response corresponding to the two termination types, short and open terminations.
Figure 6:
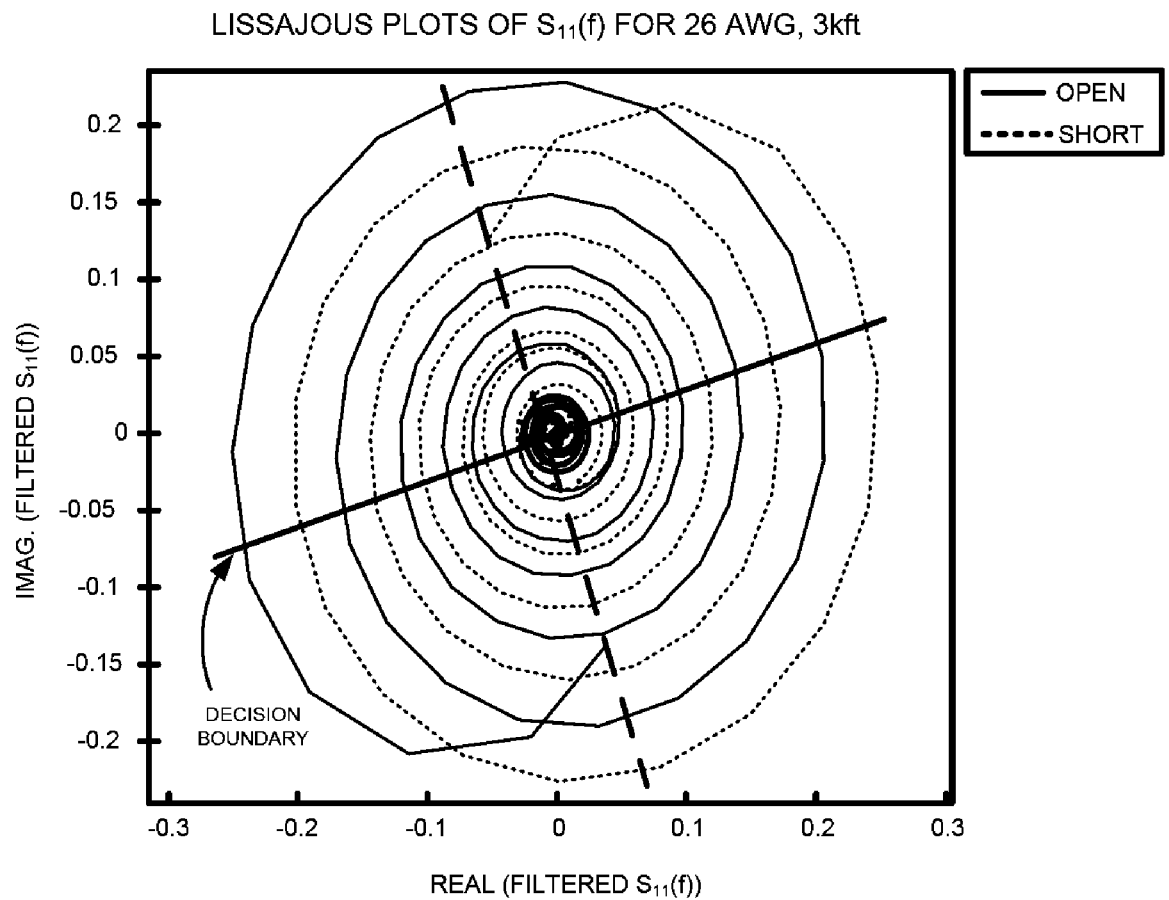
FIG. 6 provides a Lissajous plot of the real and imaginary signal components of the filtered SELT-FDR echo signal S11.

FIG. 5 illustrates the interleaved pattern in the amplitude of the S11 signal caused by the phase variation in the echo response corresponding to the two termination types, i.e., short and open terminations. This is in contrast to the case of a matched termination, which ideally does not generate any echo. FIG. 6 provides a Lissajous plot of the real and imaginary signal components of the filtered SELT-FDR echo signal S11. Based on the Lissajous plot, decision boundaries demarcating the regions of occurrences of signal elements (at different frequencies or bins) corresponding to open and short terminated loops are empirically modeled. While these decision regions are in general independent of the loop gauge, they are dependent on the particular design of the platform incorporated at the central office (CO). Moreover, while the loop gauge information is not a pre-requisite, a priori knowledge of the loop gauge may however be utilized to select gauge-specific decision regions. Determining the termination type of a particular loop involves a training phase whereby a set of frequency bins depicting consistent, un-calibrated (filtered or unfiltered) S11 phase responses as a function of loop length is identified. For purposes of this disclosure, "consistent" phase responses generally refer to phase responses which exhibit a well-defined, uniform demarcation between phase responses corresponding to open and those corresponding to short terminated loops.

Figure 7A:
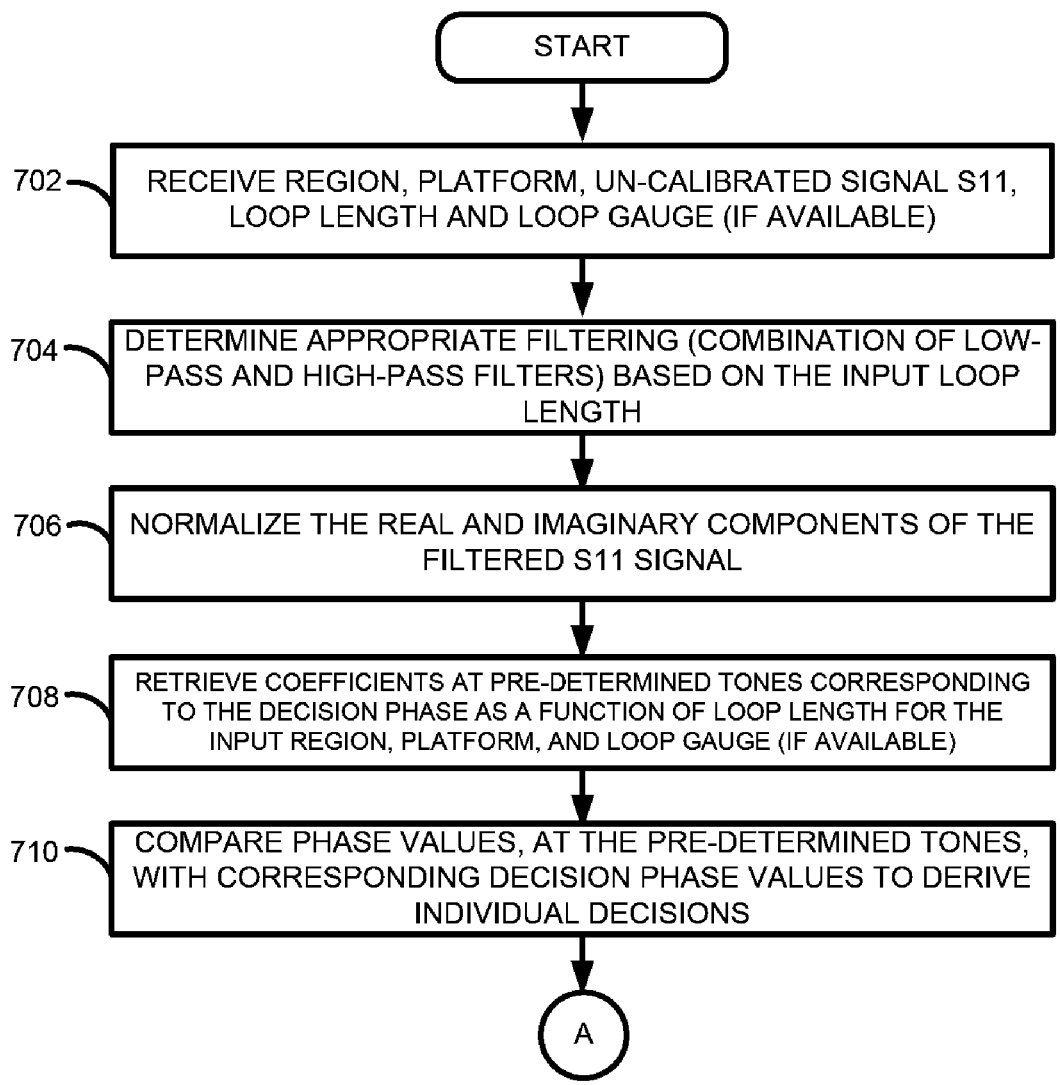
FIGS. 7A-B depict a flowchart of an exemplary embodiment for determining the loop termination type, as depicted in FIG. 4.
Figure 7B:
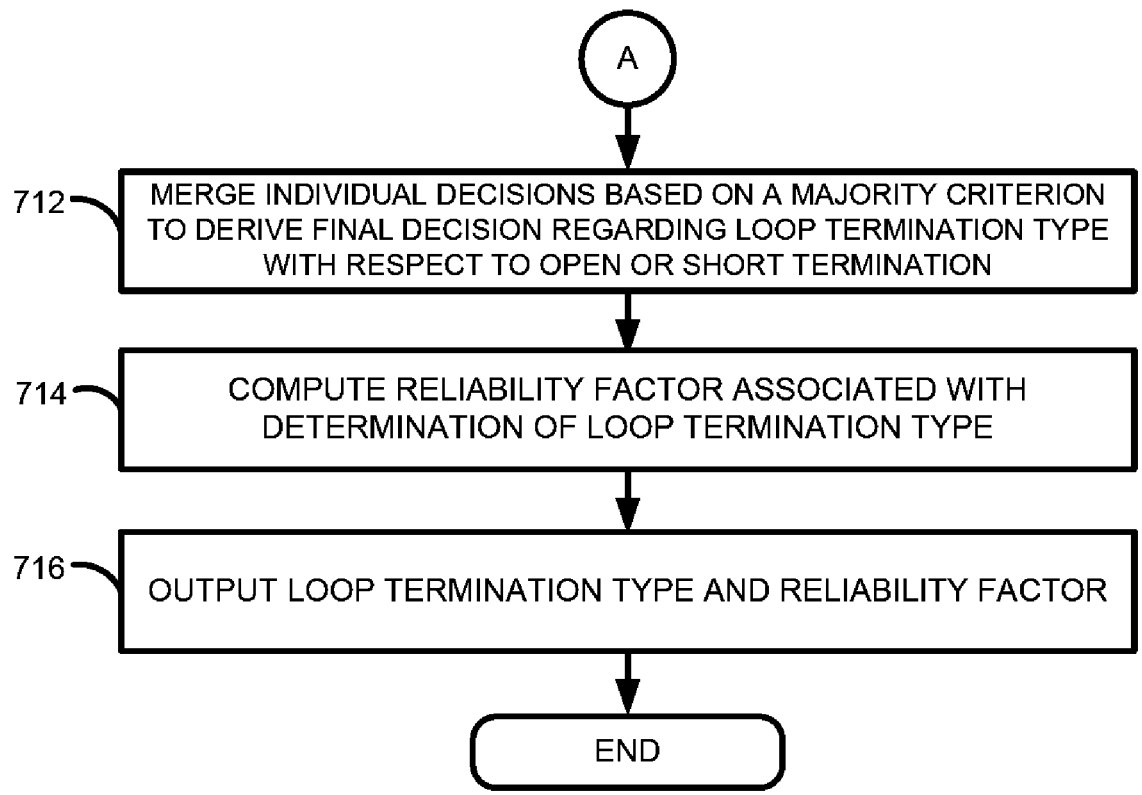

FIGS. 7A-B depict a flowchart of an exemplary embodiment for determining the loop termination type. In accordance with exemplary embodiments, block 702 begins by receiving the un-calibrated signal S11, along with the region, platform, loop length, and the loop gauge, if known. In block 704, appropriate filtering based on the received loop length is determined. The filtering may be comprised of a combination of low-pass and high-pass filters. The un-calibrated signal is filtered because of the presence of background noise and because of higher signal attenuation experienced with increasing loop lengths. The filtering also results in a smooth progression between the slopes of the decision boundaries at the changeover lengths. In accordance with some embodiments, a low-pass filtered derivative signal is used to compute the phase values, where the order of the derivative increases with loop-length.

In block 706, the real and imaginary components of the S11 signal are normalized, individually, and in block 708, predetermined coefficients for predetermined tones are specified based on the platform. These coefficients and tones correspond to the polynomial-fitted decision phase values as a function of loop length for the region, platform, and loop gauge (if available) specified in block 702; where the decision phase values may correspond to either the perpendicular bisector of the line joining the signal elements corresponding to open and short terminated loops at the specified tone(s) or, in some cases, the angular bisector of the phase between signal elements corresponding to the two termination types, at the specified tone(s). The input loop length applied to the specified polynomial coefficients is used to compute the threshold values, at the specified tones.

In block 710, the phase values at predetermined tones are compared with corresponding decision phase values in order to derive individual decisions regarding the loop termination type. These individual decisions are then merged based on a majority criterion to derive a final loop termination determination (block 712). In accordance with some embodiments, the reliability factor may be based on the majority criterion relating to the individual decisions merged together in block 712.

In accordance with some embodiments, the reliability factor may be based on the closeness of the observed phase value to the threshold in terms of some distance metric (e.g., Euclidean distance). Further, high, low and/or moderate reliabilities may be determined. A reliability factor associated with the loop termination determination is determined in block 714. In block 716, the reliability factor and the loop termination type are output. Having described the framework for determining the loop termination type, methods for obtaining the predetermined coefficients (as set forth above for block 708) are now described. In particular, the perpendicular bisector and angular bisector approaches are discussed.

With the perpendicular bisector approach, phase thresholds as a function of loop length are constructed by computing the angles of perpendicular bisectors of a line joining the signal elements (on a complex plane) pertaining to open and short terminated loops at predetermined tones. The reliability of the detection methodology, however, depends largely on how closely the perpendicular bisector, for a given tone, passes through the origin. In particular, the degree of reliability depends on whether the bisector has a zero (or approximately zero) intercept value. Since the intercept tends to deviate from the origin as the loop length increases, the perpendicular bisector approach is generally used for short and intermediate loop lengths.

With the angular bisector approach, phase thresholds as a function of loop length are constructed by computing the angles that bisect phase values corresponding to open and short terminated loops for predetermined tones. At longer loop lengths, however, the computed phase-thresholds for a given loop length can deviate significantly from port to port of the CO platform. To address this, (combined) tone-specific phase-thresholds are obtained by grouping together the phase-values for several ports across two groups, depending on the termination (i.e., open vs. short termination).

Figure 8:
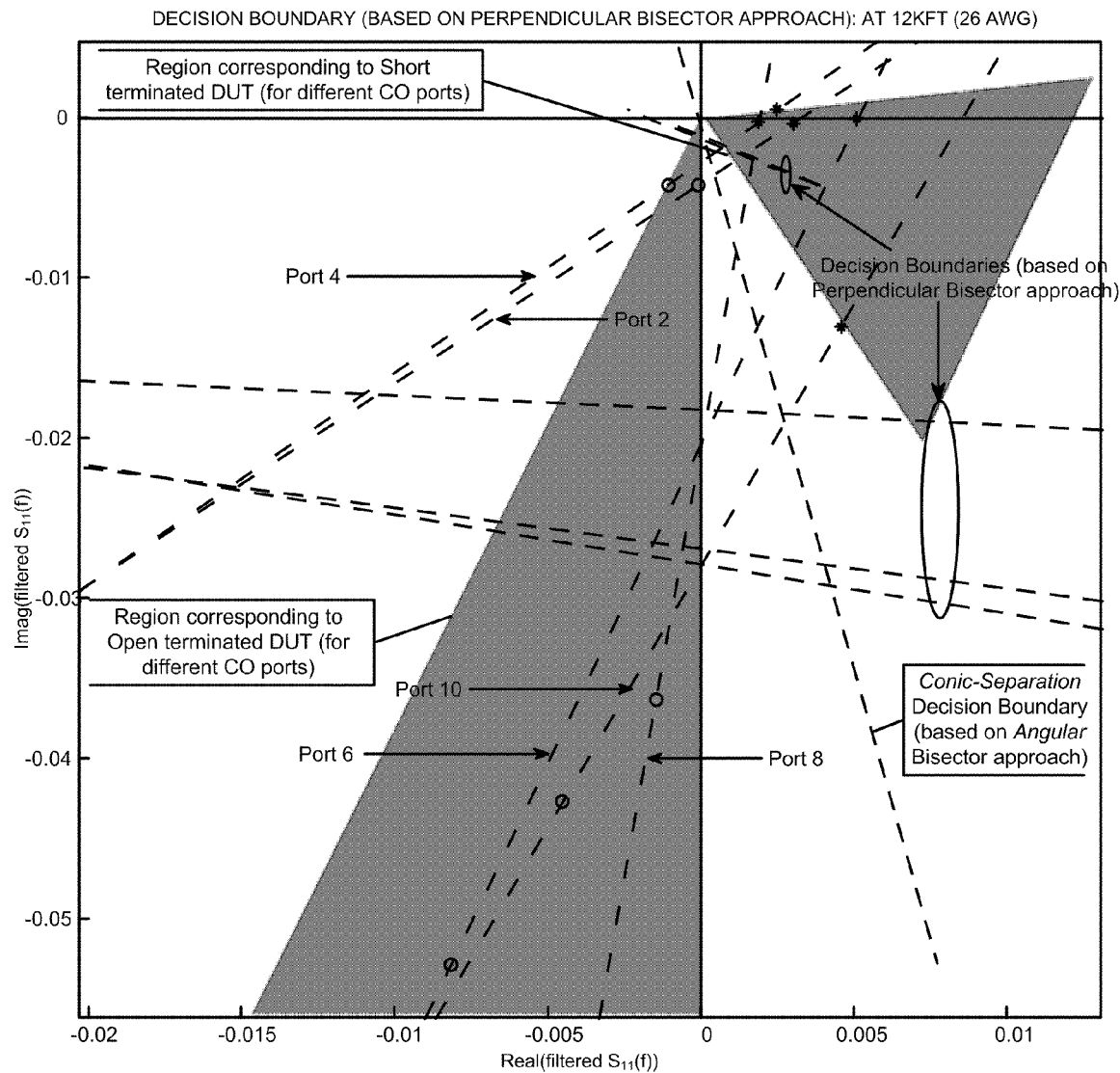
FIG. 8 illustrates decision boundaries used for determining the state of loop termination.
Figure 9A:
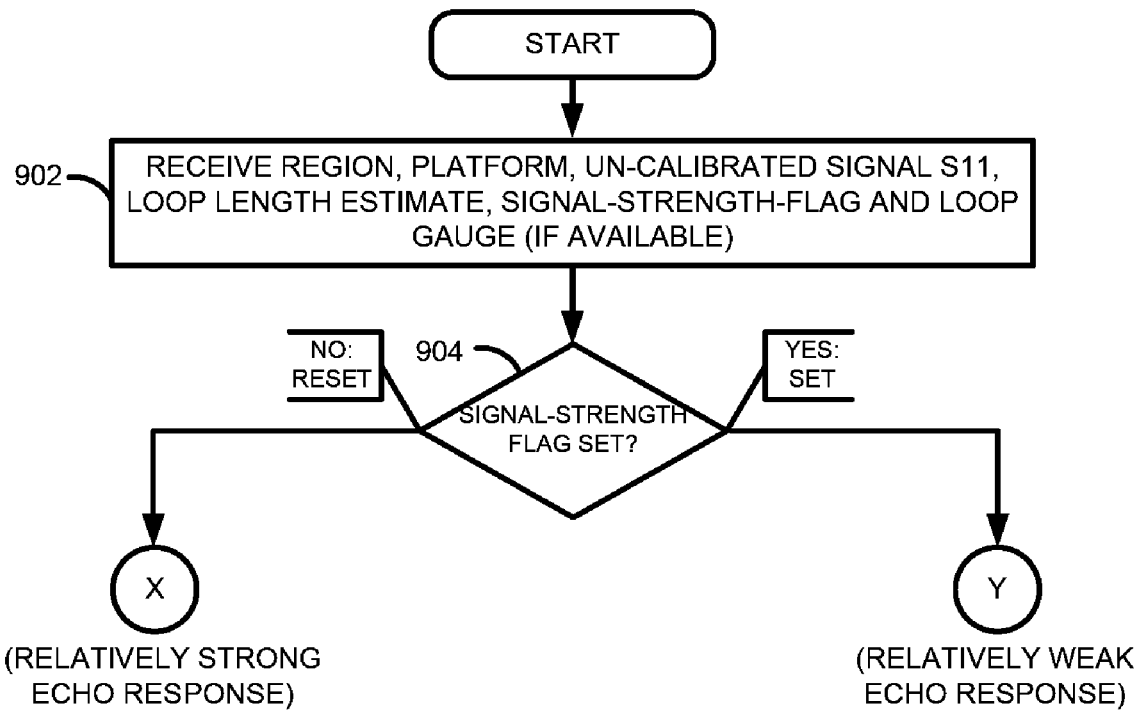
FIGS. 9A-D depict a flowchart for determining whether a loop under test is terminated by a matched-impedance.
Figure 9B:
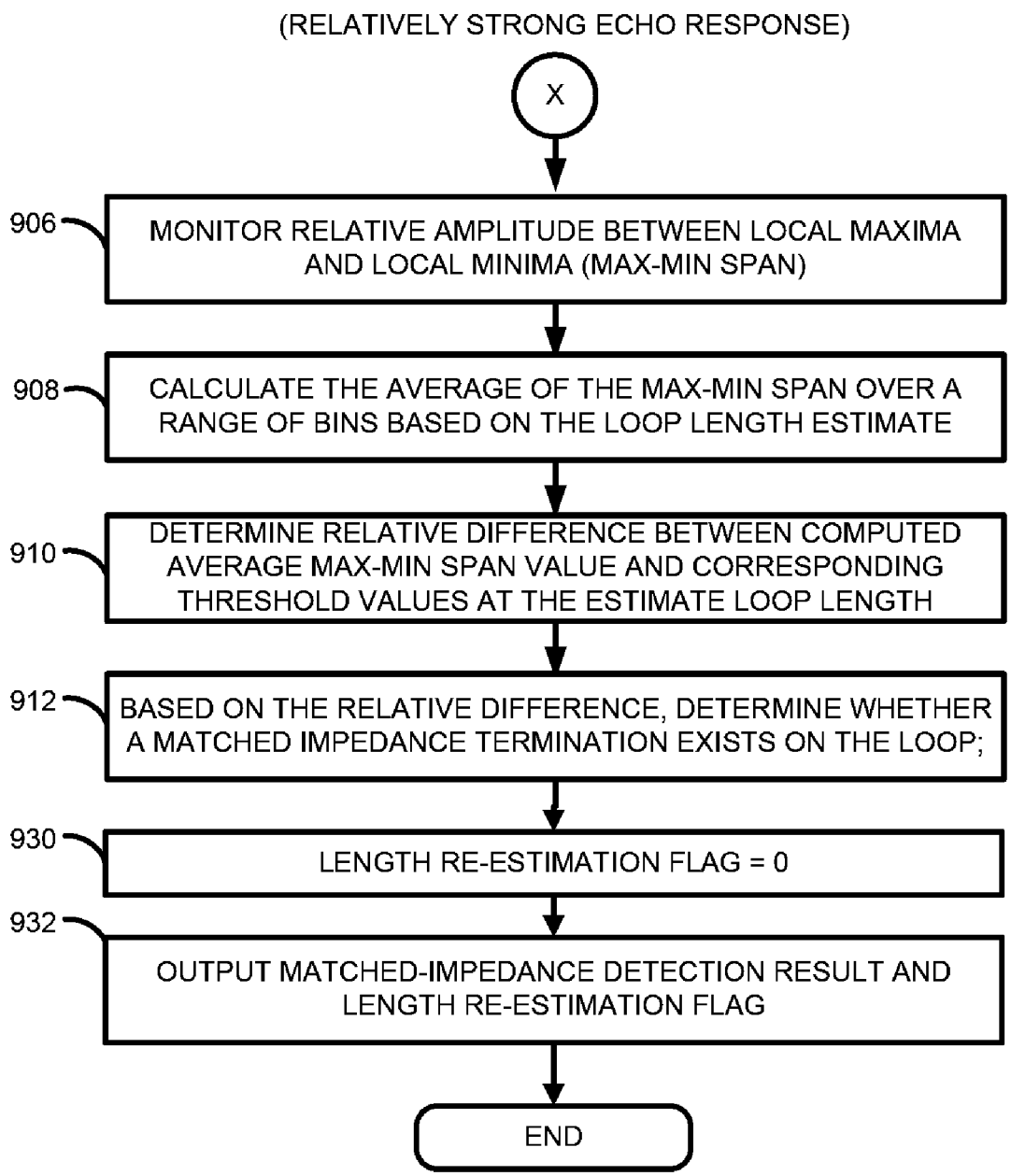
Figure 9C:
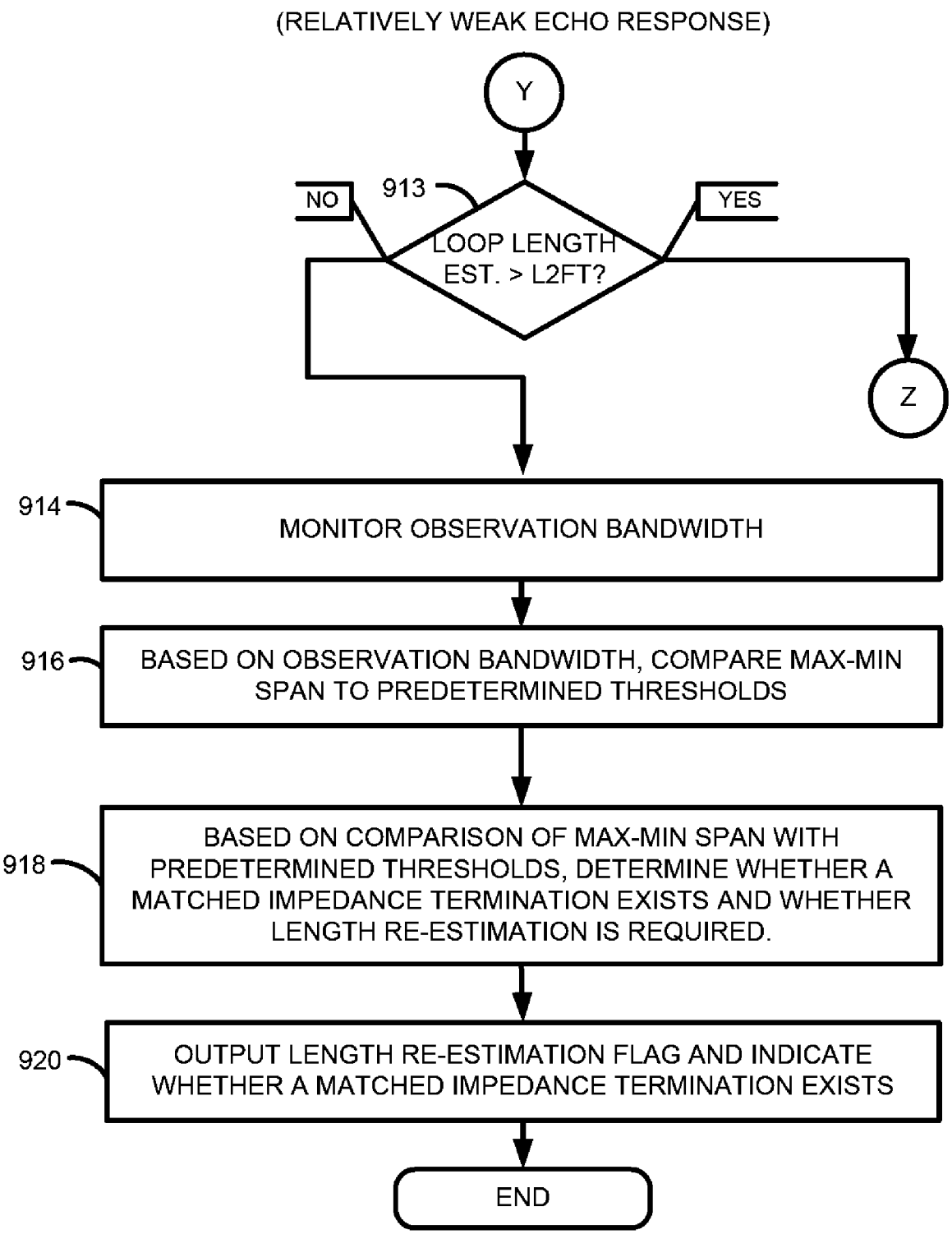
Figure 9D:
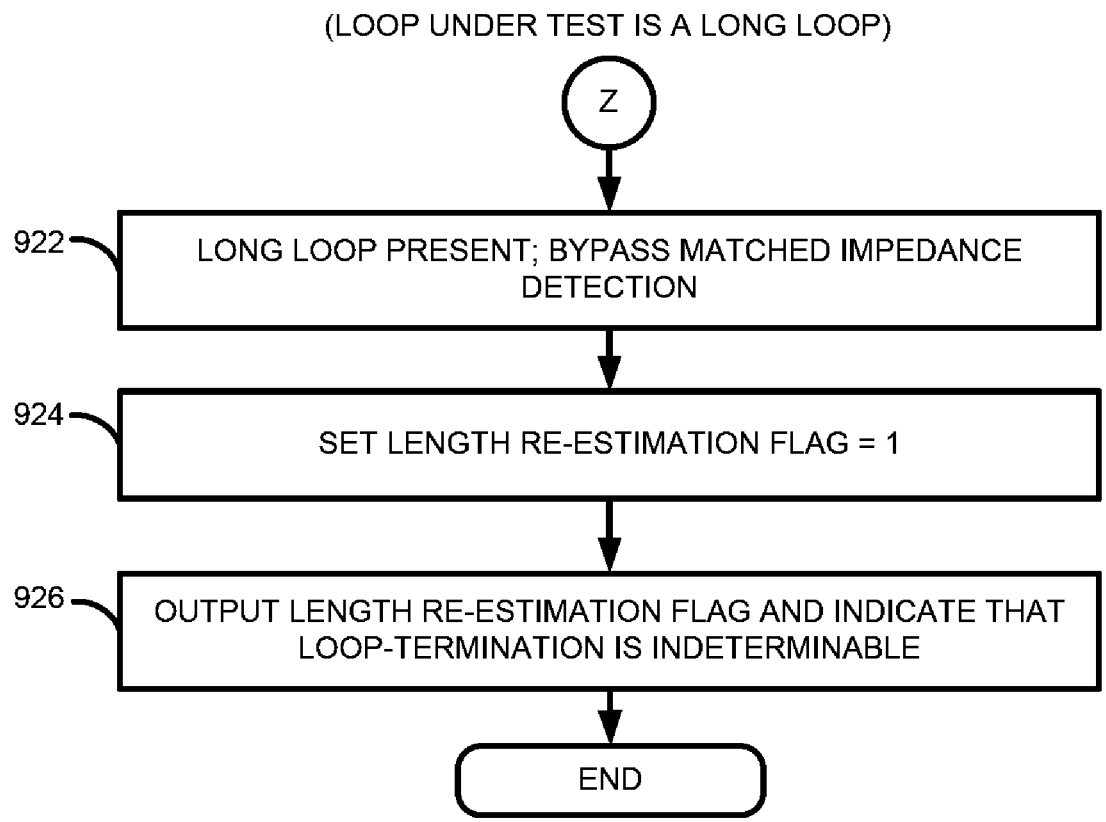

With reference to FIG. 8, when viewed on the complex plane, the various groups of signal elements (for different ports) corresponding to each of the two different terminations (depicted as circles for open termination and asterisks for short termination) form conical regions with the vertex at the origin. FIG. 8 shows the decision boundaries for determining loop termination. In particular, the decision boundaries are shown for a loop length of 12 kft at (tone) bin no. 35. The combined phase-threshold is obtained by determining the angle of the angular bisector (i.e., the line passing through the origin that most effectively demarcates the conical regions). With a known loop length and loop gauge (if known a priori), the loop termination (open vs. short) is determined by merging, based on the majority criterion, the independent decisions obtained over the specified frequency bins. In addition, a measure of the reliability factor is also output with the detected termination.

In addition to determining whether the loop is open or short terminated, it is also possible to determine whether a matched-impedance termination is present at the loop end. Preferred embodiments for detecting matched-impedance terminations are now described. In general, a loop terminated with a matched load ideally does not cause any signal reflection. As such, the presence of a matched load may be associated with a high degree of attenuation observed in the received signal. However, signal attenuation is also a function of the loop length. Therefore, similar behavior is observed in both long loops (irrespective of the termination) and loops terminated with a matched-impedance termination (irrespective of the loop length). Accordingly, embodiments are described for two scenarios—1) when a relatively strong echo response is received; and 2) when a relatively weak echo response is received.

Figure 10A:
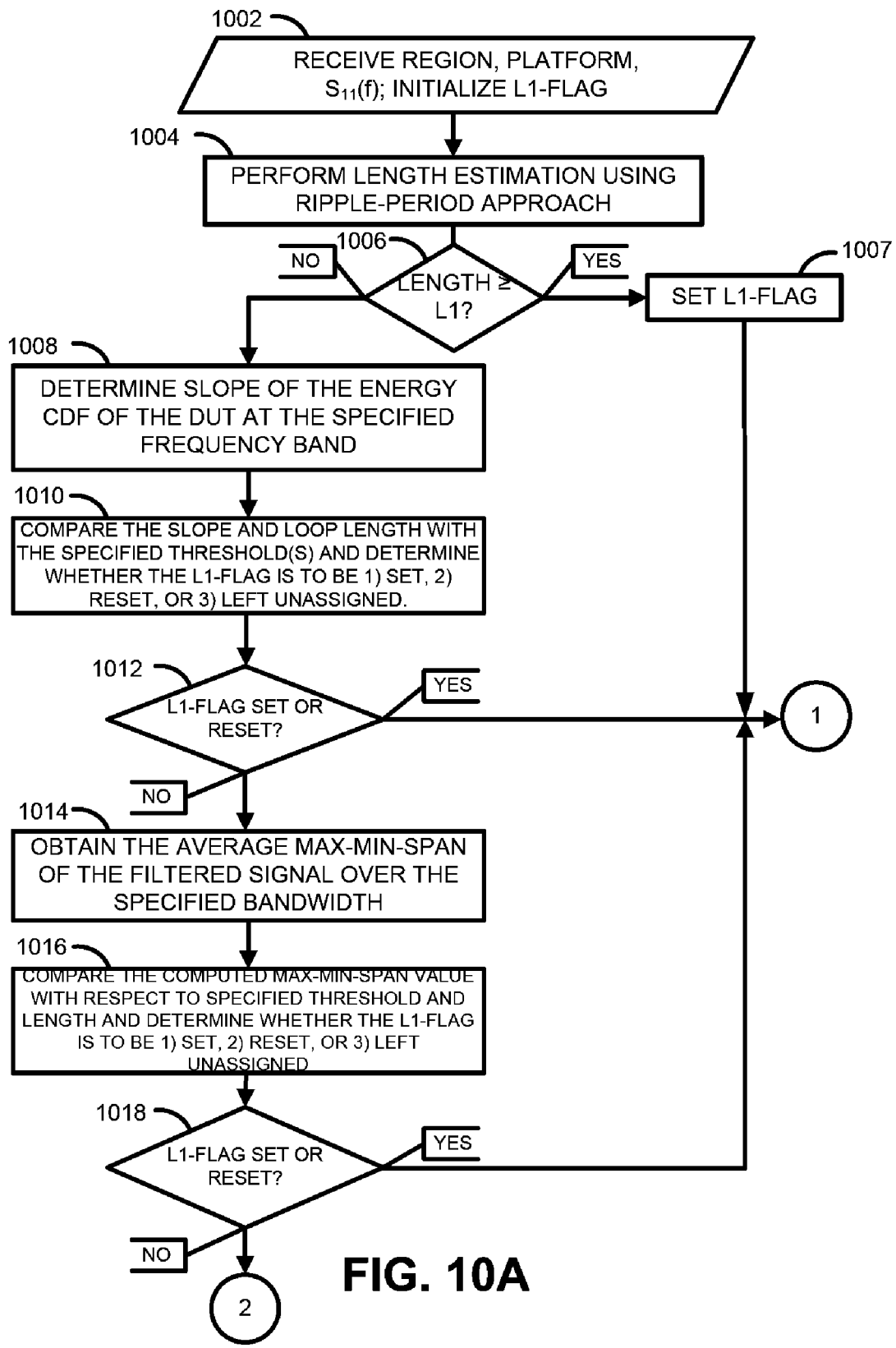
FIGS. 10A-B depict a flowchart for determining whether a loop under test has a relatively strong echo response or a relatively weak echo response.
Figure 10B:
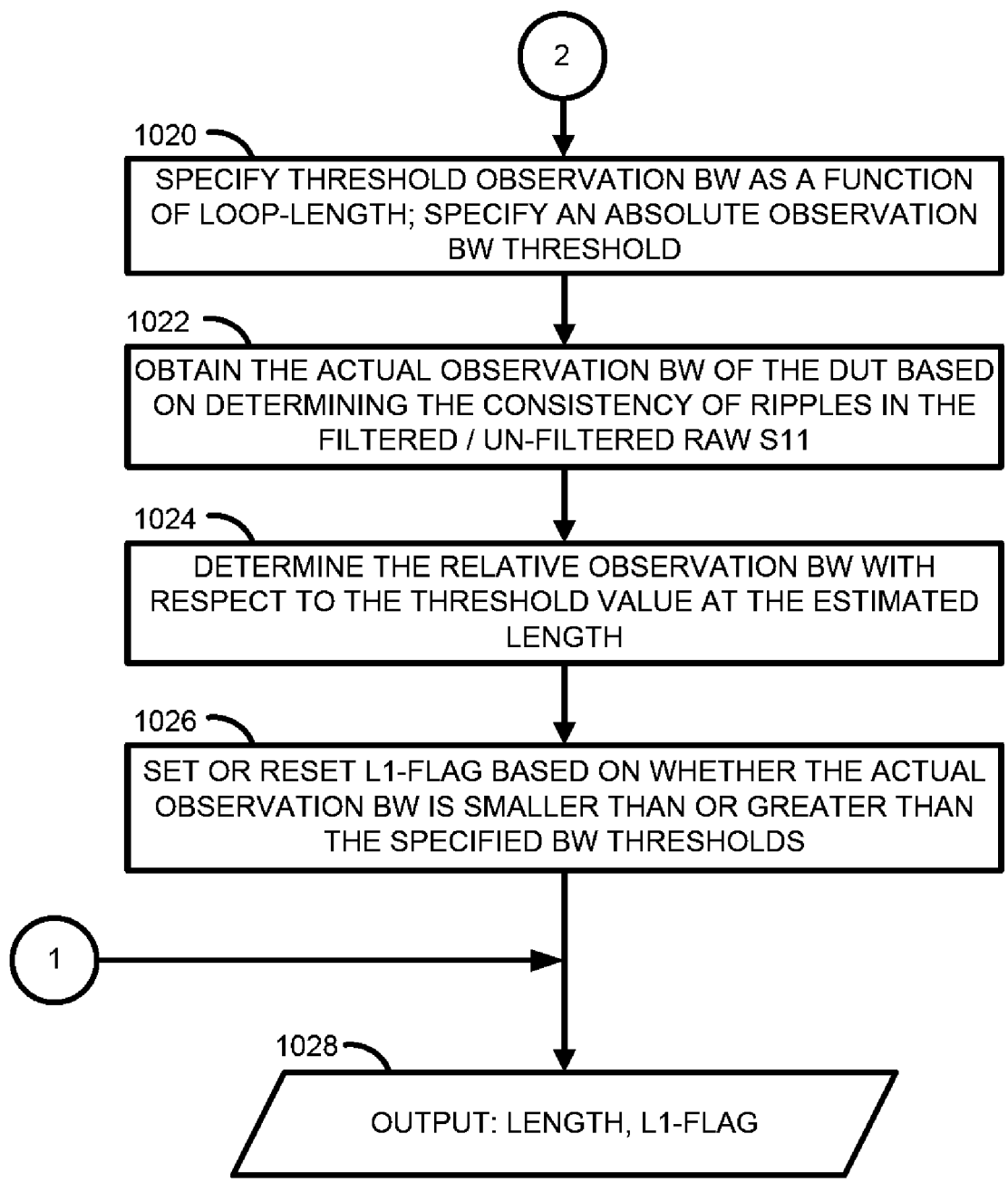

Reference is now made to FIGS. 10A-B, which is a flowchart for an embodiment for classifying a loop under test as either having a relatively strong echo response or as having a relatively weak echo response. Block 1002 begins by receiving the un-calibrated S11 signal, the platform type, and region associated with the loop (DUT). L1-Flag, which denotes a signal strength flag for purposes of this disclosure, is also initialized to a value different from the set or reset state (e.g., a null value). In block 1004, a preliminary loop length estimate is performed based on the ripple-period approach, which examines the frequency of ripples associated with an un-calibrated (filtered or unfiltered) S11 signal. It should be emphasized that this, however, is only one of multiple factors used to characterize a given loop in order to accurately classify the loop. It should also be emphasized that in various steps discussed below, determination of a particular DUT classification may be triggered. Accordingly, subsequent steps in the process are bypassed.

With reference to decision block 1006, if the loop length is greater than or equal to threshold L1, then the flag or indicator, denoted as L1-Flag in this disclosure, is set (block 1007); otherwise, if the loop length is smaller than the threshold L1, the slope of the energy cumulative distribution function (CDF) of the loop (DUT) is determined for a specified frequency band (block 1008). This step is performed to help ensure that short loops are not incorrectly flagged as long loops.

In block 1010, the slope and the loop length are compared with specified thresholds based on the platform type specified in block 1002. A determination is then made on whether to set the L1-Flag, reset the L1-Flag, or leave the L1-Flag unassigned. If the specified criterion is fulfilled, the L1-Flag is set or reset based on the outcome. As a non-limiting example, the L1-Flag is set if the slope is smaller than the specified threshold for a specified range of loop length, thereby indicating that the loop is greater than L1. While L1-Flag is used to specify the classification of the DUT (less than or greater than and equal to L1), it should be emphasized that the classification can be specified in any number of ways.

In decision block 1012, if the L1-Flag is not assigned a value (i.e., where the L1-flag is not set or reset such that L1-Flag equals the initialized value), than the average maxima-minima span of the ripples for the filtered (or unfiltered) S11 signal is obtained over a specified bandwidth (block 1014). This maxima-minima span is then compared to a threshold at the estimated loop length, based on the platform specified in block 1002. As a non-limiting example, if the maxima-minima span is greater than the threshold, then the L1-Flag is reset in block 1016, thereby indicating that the DUT is less than L1.

If the maxima-minima span is not greater than the threshold, then L1-Flag is either set or not assigned a value at all. In decision block 1018 (similar to block 1012), if L1-Flag is not set or reset (i.e., unassigned), then in block 1020 a threshold observation bandwidth is specified as a function of loop length. An absolute observation bandwidth threshold is also specified. The actual (relevant) observation bandwidth of the DUT is obtained based on the consistency of ripples in the filtered/unfiltered raw echo signal S11 (block 1022). The "relevant" observation bandwidth is defined as the band across which the local maxima and local minima in the filtered (or unfiltered) S11 signal occur consistently.

In block 1024, the relative observation bandwidth, which is the actual observation bandwidth with respect to the threshold value at the estimated loop length obtained from block 1004, is determined. In block 1026, the actual observation bandwidth undergoes one or more comparisons with the specified observation bandwidth threshold values. As a non-limiting example, the L1-Flag is set if the actual observation bandwidth is less than the specified absolute bandwidth threshold value. The L1-Flag is determined eventually based on multiple criteria which are carried out conditionally and sequentially in a pre-defined order to help ensure accuracy in DUT classification. Accordingly, the L1-Flag along with the estimated loop length are output in block 1028.

Reference is now made to FIGS. 9A-D, which depict a flowchart for determining whether a loop under test is terminated by a matched-impedance. Beginning with block 902, the un-calibrated S11 echo signal, along with the loop length estimate, the signal-strength-flag (i.e., L1-Flag), and the loop gauge (if available), are received. As described above, the signal-strength-flag may be set (e.g., to a value of 1) or reset (e.g., to a value of 0) based on monitored features (e.g., Max-Min-Span and energy cumulative distribution function) of the FDR-SELT un-calibrated echo that are correlated to loop-length, and not solely based on a direct comparison with the estimated loop length.

In decision block 904, when the signal-strength-flag is reset (to a value of 0), this indicates that the loop under test has a relatively strong echo response. In such instances, loops terminated with matched loads can be differentiated from an open/short termination by observing the relative amplitude between the two envelopes (local maxima and minima) in the ripples inherent in the echo signal (block 906 in FIG. 9B). The latter, referred to herein as the Max-Min Span, is averaged over a specified range of bins of the (filtered/un-filtered) echo response, wherein, the range of bins may be a function of the input loop length (block 908). This forms the criterion on which MI (matched-impedance) detection is based. The relative difference between the computed averaged (Max-Min-Span) value and the corresponding threshold value from a (platform-specific) look-up table at the estimated loop length is computed in block 910, and may be used to determine whether a matched-impedance (or a Modem powered-ON) exists on the loop under test (block 912). In block 930, the length re-estimation flag is reset (assigned a value of 0), indicating that no further refinements to the estimated loop length are required. In block 932, the length re-estimation flag and the final determination of whether a matched-impedance termination exists is output.

When the signal-strength-flag is set (i.e., assigned a value of 1) (see decision block 904), this indicates that the loop under test has a weak echo response. In such instances, the echo signal has characteristics similar to those caused by loop attenuation (in loops with or without a matched-impedance termination). As such, the technique described above provides reliable MI termination detection up to a certain loop length threshold (referred to herein as "L2 ft"). When the signal-strength-flag is set, the input loop length estimate is monitored to ensure that MI termination detection is being performed for a loop with a length less than L2 ft (decision block 913).

MI termination detection can be reliably performed for loops less than L2 ft because the echo signal characteristics of short/intermediate length MI-terminated loops differs from the echo signal for loops of longer lengths (i.e., greater than or equal to L2 ft, independent of the loop termination). Therefore, the Max-Min Span described above and the observation bandwidth (a loop-length dependent range of frequencies depicting consistent, un-calibrated (filtered or unfiltered) S11 amplitude responses) may be used as basic criterion for performing MI termination detection. In block 914, the observation bandwidth is monitored, and based on the observation bandwidth, the Max-Min Span is compared to various predetermined thresholds (block 916). In block 918, based on these comparisons, the determination is made on whether a matched-impedance exists and whether length re-estimation is required. In block 920, the length re-estimation flag is output along with an indication of whether a matched-impedance termination exists.

In accordance with exemplary embodiments, loops greater than L2 ft in length are not processed as the MI termination cannot be reliably determined because the echo signal characteristics for a matched-impedance termination tend to be similar to echo signal characteristics associated with long loops, irrespective of the loop termination. In such cases, the matched-impedance detection is bypassed (block 922 in FIG. 9D), the length re-estimation flag is set (assigned a value of 1, indicating that the loop length estimate needs to be further refined) (block 924), and the length re-estimation flag along with an indication that the loop termination is indeterminable are output (block 926 in FIG. 9D).

With reference back to the un-calibrated SELT-FDR analysis framework described in relation to FIG. 4, the detection of matched-impedance termination may be enabled or disabled (see decision block 405 in FIG. 4). In cases where matched-impedance termination detection is disabled for loop termination, the analysis framework only determines whether a loop is terminated with an open or short termination.

It should be noted that the invention is not limited to the embodiments described above. Further, it should be noted that while the processes described herein may be region-specific, many variations and modifications may be made to the above-described embodiments without departing from the principles of the present disclosure such that any number of regions can be supported. Accordingly, it should be emphasized that the above-described embodiments are merely examples of possible implementations. All such modifications and variations are intended to be included herein within the scope of this disclosure and protected by the following claims.

The invention claimed is:

1. A method for determining whether a state of loop termination of a loop is short terminated, open terminated, or terminated by a matched-impedance, the method comprising:

receiving an un-calibrated echo signal for a loop under test using frequency domain reflectometry single-ended line testing (FDR-SELT), a loop length estimate of the loop, a region, and a platform specification;

determining coefficients corresponding to each of a predetermined set of tones, wherein the set of tones is a function of loop length, and wherein the coefficients are determined based on the specified region and platform;

determining phase thresholds for the predetermined set of tones based on the determined coefficients and loop length such that the phase thresholds at the predetermined tones correspond to polynomial-fitted decision phase values that are a function of loop length for the received region and platform; and comparing the phase thresholds with corresponding phases of a filtered echo signal at each of the set of predetermined tones and determining whether the loop is terminated by an open or short termination at each of the predetermined tones.

2. The method of claim 1, wherein determining whether the loop is terminated by an open or short termination comprises merging the loop termination determinations for each of the predetermined tones to obtain an overall determination of the state of loop termination.

3. The method of claim 1, wherein determining coefficients for each of a predetermined set of tones is performed based on one of:

an angular bisector approach comprising:
for different loop lengths, computing an angle of an angular bisector of conical regions associated with open and short terminated loops on a complex plane at each predetermined tone, wherein the conical regions contain signals for open and short terminated loops across a plurality of central office (CO) ports; and
determining coefficients based on the angles for the different loop lengths;

a perpendicular bisector approach comprising:
for each loop length,
computing angles of perpendicular bisectors of lines joining signal elements on a complex plane for open and short terminated loops at each predetermined tone, wherein the angles correspond to a plurality of central office (CO) ports; and
combining the angles across the plurality of CO ports to determine a final angle; and
determining coefficients based on the final angle for each loop length.

4. The method of claim 1, wherein the steps of determining phase thresholds and comparing the phase thresholds with phase of the echo signal are bypassed if the loop under test is determined to be a long loop or if the loop is a not straight loop.

5. The method of claim 1, further comprising analyzing amplitude of the un-calibrated echo signal to determine whether the loop is terminated by a matched-impedance termination.

6. The method of claim 5, further comprising determining whether the un-calibrated echo signal is relatively weak or relatively strong based on characteristics of the un-calibrated echo that are correlated to loop-length.

7. The method of claim 6, further comprising:
for a relatively weak echo signal, determining whether the loop length estimate exceeds a length threshold; and
based on the determination, indicating that a weak signal exists and bypassing the step of determining whether the loop under test is terminated by a matched-impedance termination.

8. The method of claim 7, further comprising:
in response to determining that the loop length estimate does not exceed the length threshold or in response to determining that a relatively strong echo signal exists:
monitoring relative amplitude between local maxima and minima in ripples in the filtered echo signal;
averaging the relative amplitude across a predetermined range of frequencies; and
determining whether the loop under test is terminated with a matched-impedance load based upon difference between the average relative amplitude and corresponding pre-determined platform-specific threshold values for the estimated loop length.

9. A system for determining a state of loop termination of a loop, comprising:
a first module coupled to the loop, the first module configured to generate a test signal and receive an un-calibrated echo response of the loop; and
a second module configured to receive the un-calibrated echo response measurement from the first module, wherein the second module is further configured to receive input data indicating a region, platform type, and a loop length estimate and determine whether the loop is open terminated or short terminated based on phase of the un-calibrated echo signal.

10. The system of claim 9, wherein the first module comprises:
a signal generator to send a test signal onto the loop;
an analyzer configured to measure scattering parameters (s-parameters) based on the reflected signal and determine the echo response of the loop.

11. The system of claim 9, wherein the second module further comprises:
a filter module for filtering the un-calibrated echo signal based on the loop length;
logic for determining predetermined tones based on the loop length, wherein the predetermined tones are tones across which phase characteristics of the filtered un-calibrated echo signals associated with open and short terminated loops are observed;
logic for determining phase thresholds for the un-calibrated echo signal at the pre-determined tones, wherein the phase thresholds correspond to the polynominal-fitted decision phase values as a function of loop length, the specified region, and platform; and
logic for comparing the phase with the computed phase thresholds to derive individual determinations regarding the state of loop termination.

12. The system of claim 11, wherein the predetermined tones are derived by identifying frequency bins that exhibit a uniform demarcation between phase responses corresponding to open terminated loops and phase responses corresponding to short terminated loops as a function of loop lengths.

13. The system of claim 11, further comprising:
logic for merging the individual determinations to derive a final determination regarding the state of loop termination; and
logic for determining a reliability factor associated with the final determination utilizing a one or more of:
a majority criterion determined based on the individual decisions, and
a distance metric based on the phase values at predetermined tones and corresponding phase thresholds.

14. The system of claim 9, wherein the second module is further configured to determine whether the loop is terminated by a matched-impedance termination based on amplitude of the un-calibrated echo signal.

15. The system of claim 14, further comprising:
logic for determining a relative strength of the un-calibrated echo signal based on characteristics of the un-calibrated echo that are correlated to loop-length;

logic for determining, upon detection of a relatively weak echo signal, whether the loop length estimate exceeds a length threshold and indicating that a determination, of whether a matched-impedance termination exists, is not available; and logic for monitoring, upon detection of a relatively strong echo signal or upon determination that the loop length estimate does not exceed the length threshold, relative amplitude between local maxima and minima in ripples in the echo signal, averaging the relative amplitude across a predetermined range of frequencies, and indicating whether the loop under test is terminated with a matched-impedance load based upon difference between the average relative amplitude and corresponding predetermined platform-specific threshold values for the estimated loop length.

16. A method for determining a state of loop termination of a loop under test, comprising:

receiving an un-calibrated echo signal for the loop under test using frequency domain reflectometry single-ended line testing (FDR-SELT); and determining the state of loop termination based on phase of the un-calibrated echo signal, wherein determining the state of loop termination comprises determining whether the loop is terminated by an open termination or a short termination by correlating the phase of the echo signal with an expected phase of the echo signal derived from measurements taken at the same loop length for open and short terminations.

17. The method of claim 16, wherein determining the state of loop termination is bypassed if the loop under test is a long loop based on a predetermined length threshold or if the loop is not a straight loop.

18. The method of claim 16, further comprising:
receiving input data indicating a loop length estimate;
receiving input data indicating a platform specification;
filtering the un-calibrated echo signal; and
receiving input data indicating a region of the loop under test.

19. The method of claim 18, further comprising receiving a loop gauge of the loop under test.

20. The method of claim 18, wherein filtering the un-calibrated echo signal comprises filtering the echo signal with a combination of low-pass and high-pass filters based on the loop length estimate.

21. The method of claim 18, further comprising:
retrieving phase thresholds for the un-calibrated echo signal at predetermined tones, wherein the phase thresholds at the predetermined tones correspond to polynomial-fitted decision phase values that are a function of loop length for the received region and platform;
comparing the phase of the echo signal at the predetermined tones with the phase thresholds to derive individual loop termination determinations; and
merging the individual decisions to derive a final determination regarding the loop termination.

22. The method of claim 21, further comprising determining a reliability factor associated with the final loop termination determination utilizing one or more of:
a majority criterion determined based on the individual decisions; and
a distance metric based on the phase values at predetermined tones and corresponding phase thresholds.

23. The method of claim 21, wherein the predetermined tones are derived by identifying frequency bins that exhibit a uniform demarcation between phase responses corresponding to open terminated loops and phase responses corresponding to short terminated loops as a function of loop lengths.

24. The method of claim 21, wherein retrieving the phase thresholds is performed based on an angular bisector approach, wherein the angular bisector approach comprises:
for different loop lengths, computing an angle of an angular bisector of conical regions associated with open and short terminated loops on a complex plane at each predetermined tone, wherein the conical regions contain signals for open and short terminated loops across a plurality of central office (CO) ports; and
determining coefficients based on the angles for the different loop lengths.

25. The method of claim 21, wherein deriving the phase thresholds is based on a perpendicular bisector approach, wherein the perpendicular bisector approach comprises:
for each loop length,
computing angles of perpendicular bisectors of lines joining signal elements on a complex plane for open and short terminated loops at each predetermined tone, wherein the angles correspond to a plurality of central office (CO) ports; and
combining the angles across the plurality of CO ports to determine a final angle; and
determining coefficients based on the final angle for each loop length.

26. The method of claim 16, further comprising:
analyzing amplitude of the un-calibrated echo signal;
determining whether the loop is terminated by a matched-impedance termination based on the amplitude.

27. The method of claim 26, further comprising determining whether the un-calibrated echo signal is relatively weak or relatively strong based on characteristics of the un-calibrated echo that are correlated to loop-length.

28. The method of claim 27, further comprising:
for a relatively weak echo signal, determining whether the loop length estimate exceeds a length threshold; and
in response to determining that the loop length exceeds the length threshold, indicating that a weak signal exists and bypassing the step of determining whether the loop under test is terminated by a matched-impedance termination.

29. The method of claim 28, further comprising:
in response to determining that the loop length estimate does not exceed the length threshold or in response to determining that a relatively strong echo signal exists:
monitoring relative amplitude between local maxima and minima in ripples in the echo signal;
averaging the relative amplitude across a predetermined range of frequencies; and
determining whether the loop under test is terminated with a matched-impedance load based upon difference between the average relative amplitude and corresponding predetermined platform-specific threshold values for the estimated loop length.

30. The system of claim 9, wherein the input data indicating a region comprises input data indicating a geographic area where the loop under test is physically located.

31. The method of claim 18, wherein the input data indicating a region comprises input data indicating a geographic area where the loop under test is physically located.

* * * * *

UNITED STATES PATENT AND TRADEMARK OFFICE
CERTIFICATE OF CORRECTION

| | |
|---|---|
| PATENT NO. | : 8,300,771 B2 |
| APPLICATION NO. | : 12/325541 |
| DATED | : October 30, 2012 |
| INVENTOR(S) | : Dinesh et al. |

It is certified that error appears in the above-identified patent and that said Letters Patent is hereby corrected as shown below:

On the Title Page, item (75), under "Inventors", in Column 1, Line 2, delete "Up" and insert -- UP, --, therefor.

In Column 4, Line 48, delete "S11, S11(f)," and insert -- S11, $S_{11}(f)$ --, therefor.

In Column 8, Line 9, delete "0S11" and insert -- S11 --, therefor.

Signed and Sealed this
Nineteenth Day of March, 2013

Teresa Stanek Rea
*Acting Director of the United States Patent and Trademark Office*